Oct. 23, 1962 H. L. DILLINER 3,059,449
REFRIGERATING APPARATUS FOR AUTOMOBILES
Filed Sept. 9, 1957 2 Sheets-Sheet 1
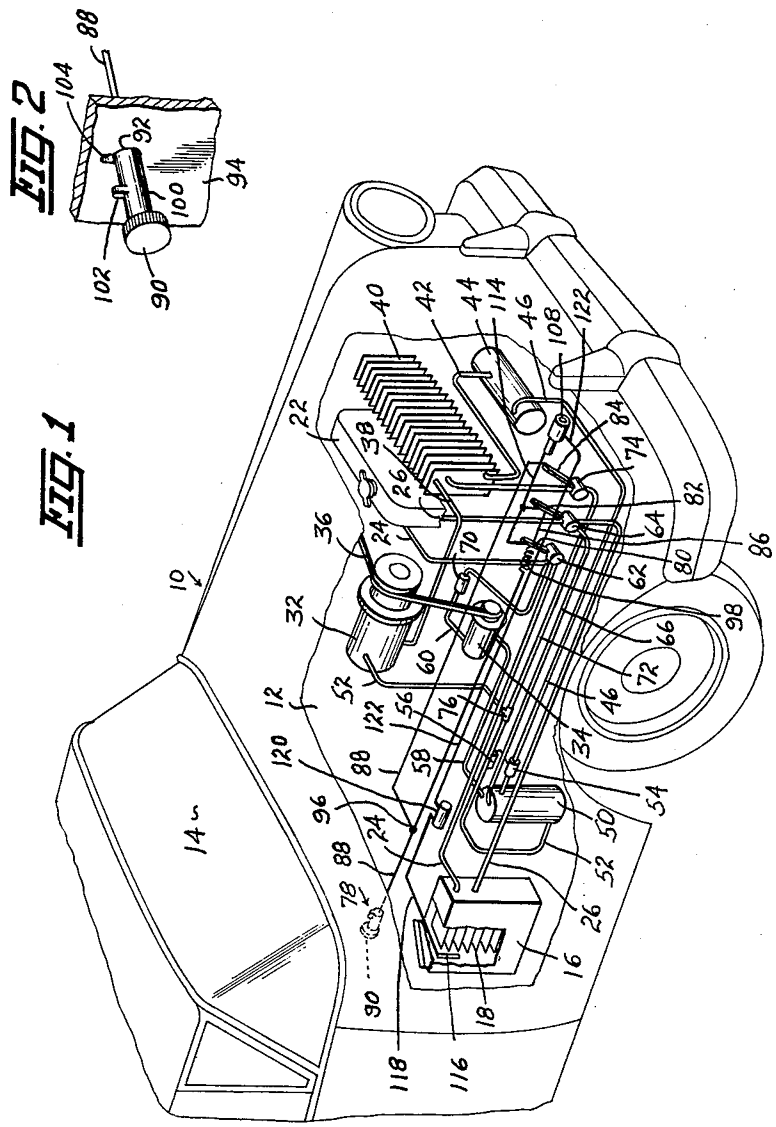
INVENTOR.
HERMAN L. DILLINER
BY Morton S. Adler
ATTORNEY.

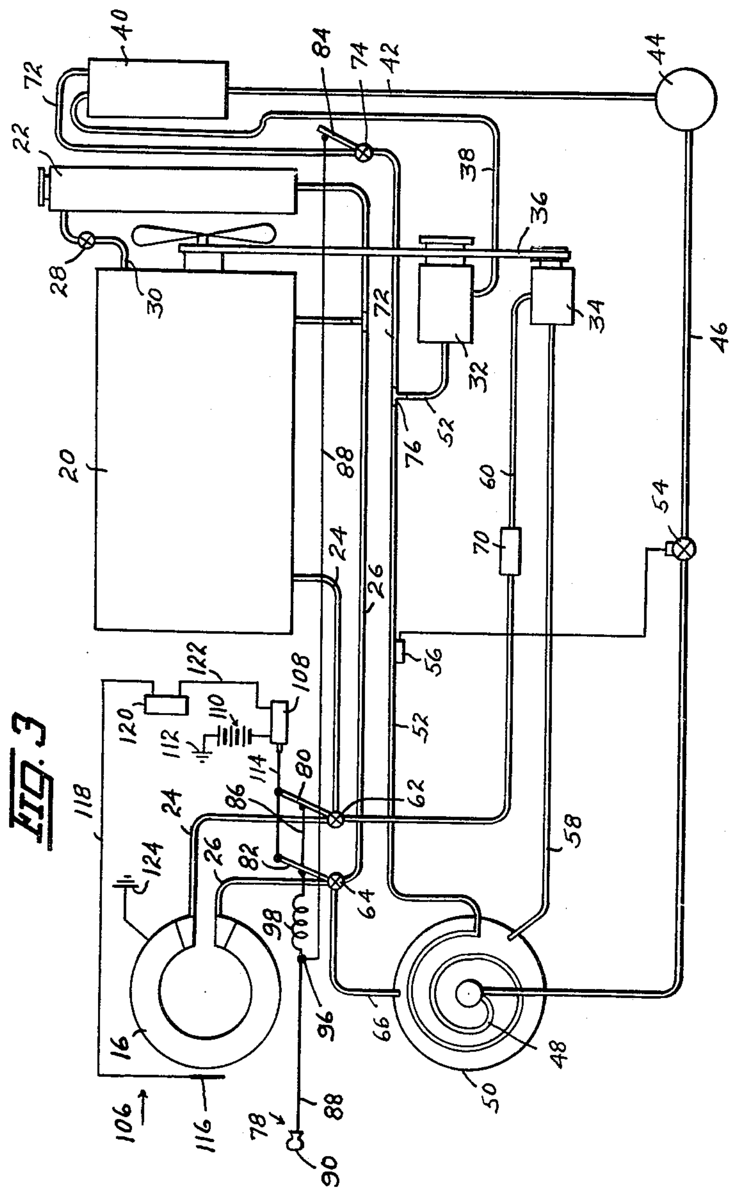
INVENTOR.
HERMAN L. DILLINER
BY Morton S. Adler
ATTORNEY.

United States Patent Office 3,059,449

Patented Oct. 23, 1962

3,059,449

REFRIGERATING APPARATUS FOR AUTOMOBILES

Herman L. Dilliner, Leon, Iowa, assignor, by mesne assignments, to Indico Valve Corporation, a corporation of Illinois Filed Sept. 9, 1957, Ser. No. 682,860
8 Claims. (Cl. 62—239)

My invention relates to refrigerating apparatus and is more particularly designed for use as an air conditioning system on motor vehicles.

One of the important objects contemplated by this invention is the provision of a closed refrigerating system having valved connection with the regular engine cooling system so as to utilize the fluid in the regular system.

Another object herein is to provide a refrigerating system of the above class that includes the regular vehicle heater as the air contacting coil within its closed system when in operation and at the same time excluding from such heater hot fluid from the engine cooling system.

A further object herein is to provide an extremely economical but efficient vehicle air conditioning system that can be easily and quickly installed in or removed from the regular engine cooling system, and which is wholly located in the engine compartment of the vehicle.

Still another object inhering in this invention is the provision of a by-pass valve for the compressor when not in use and a novel control means for simultaneously operating such valve together with the valved connection from my refrigerating system and the cooling system of the engine to selectively place the refrigerating system either in or out of operation.

Another important object of this invention is to provide an automatically operable control means associated with the regular vehicle heater that will momentarily permit a surge of hot fluid from the regular engine cooling system to pass through the heater and remove any ice or frost formed thereon. In this respect experience with auto air conditioning systems has shown that improper adjustment of the expansion coil relative to the capacity of the fan discharging cool air into the passenger compartment has resulted in the air contacting coil associated with the fan becoming blocked by ice and thus considerably impairing if not destroying the cooling capacity of the system. Such an event requires the air conditioning system to be turned off long enough to melt the ice and thus I have provided a means to do this automatically and at the proper time to avoid any execessive ice accumulation and impairment in the efficiency of the system.

A further object herein is the provision of an air conditioning system for a motor vehicle that can be operated, if desired, solely by the vehicle engine so as to require no electrical energy and thus eliminate connections to the car battery and the resultant drain on the same.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

FIG. 1 is a fragmentary perspective view of a motor vehicle partly broken away and showing this invention in a general diagrammatic arrangement within the engine compartment thereof, FIG. 2 is a fragmentary perspective view showing my valve control cable mounted on the dashboard of the vehicle, and FIG. 3 is a diagrammatic view showing the refrigerating and water cooling system used in the vehicle.

Referring to the drawings a motor vehicle is indicated generally by the numeral 10 having the engine compartment 12 and passenger compartment 14. A car heater 16 which may be of any type having a water coil 18 may be located in the forward part of the passenger compartment 14 or at any other suitable place commonly used for the same and for heating purposes is connected to the engine 20 (FIG. 2) and the radiator 22 by fluid lines 24 and 26. A thermostat 28 is located in the water line 30 between the radiator 22 and engine 20 as is well known in the art. No invention is claimed in any of the structure or arrangements so far described as the same is merely illustrative of the environment in which this invention is used and compartment 14, while designated here as for passengers, may also be any area or section of the vehicle used for the storage of materials under circumstances where temperature control is a factor. It will be understood, also that heater 16 will have a suitable fan associated therewith as is well known and thus the same is not shown and that preferably the cooling system of the engine should contain an anti-freeze fluid of any suitable kind such as are in common use.

The various elements making up the refrigerating system are illustrated diagrammatically since no invention is claimed in such parts per se but rather in their cooperative relationship as will later appear. The refrigerating system used here includes a refrigerant compressor 32 and pump 34 adapted to be driven from the vehicle engine 20 by means of the belt 36 and such compressor 32 and pump 34 operate in separate closed circuits as follows. A compressed refrigerant is moved by compressor 32 through line 38 to a condenser 40 that is mounted in front of the radiator 22 and moves from the condenser 40 through line 42 into a receiver 44. From receiver 44 the refrigerant moves through line 46 into a coil 48 of the heat exchange unit 50 and leaves unit 50 by line 52 to return to the compressor 32. An expansion valve 54 in line 46 regulates the flow in such line by surface connection with the suction line 52 in the form of the thermostatic bulb 56 as is well known.

The heat exchanger 50 will contain fluid from the engine cooling system which will be cooled by the refrigerant passing through coil 48 and is circulated by pump 34 through the heater 16 acting as an air contact coil as follows.

The cooled fluid in unit 50 is circulated through line 58 through pump 34, through line 60 and into line 24 from engine 20 to the heater 16 at the valve connection 62. Leaving the heater 16 through line 26, the refrigerant will be diverted by valve 64 to line 66 back into unit 50. An expansion tank 70 is placed in line 60 to accommodate the expanded fluid in this circuit when the refrigerating system is not in use. Compressor 32 is designed to operate at all times the engine 20 is operating and to eliminate the flow of the refrigerant through the refrigerating system when such system is not in use I have used a refrigerant by-pass circuit which includes a line 72, with the by-pass valve 74 therein, running from the condenser 40 to a fitting 76 connecting to line 52 back to the compressor 32. Thus when valve 74 is open, the refrigerant will move only from the compressor 32 through line 38 to the condenser 40 and back to the compressor 32 through lines 72 and 52. Only a sufficient portion of condenser 40 is used to dissipate heat in the small amount of refrigerant being circulated.

Thus far described it will be appreciated that operation of valves 62 and 64 will take heater 16 out of the normal engine cooling circuit and place it in the cooling circuit of my refrigerating system and of course reverse this arrangement when desired. By-pass valve 74 is set to be closed when heater 16 is made a part of the refrigerating system and to be open when the heater is returned to association with the engine cooling circuit. Thus both valves 62 and 64 must be operated to put the refrigerating system either into or out of operation and I have provided a manual control means indicated generally at 78 for simultaneously operating not only valves 62 and 64 but also valve 74. It will be understood, however, that valve 74 need not a matter of necessity be opened when the refrigerating system is not operating, but it is desirable to do so to eliminate unnecessary circulation of the refrigerant by the compressor 32. For purpose of my valve control means 78 I have provided valves 62, 64 and 74 with the respective operating levers 80, 82 and 84. Levers 80 and 82 are tied together by the rigid link 86 and lever 84 is connected by a push-pull cable 88 to knob 90 located in the passenger compartment 14 for manual operation, such cable passing through an opening 92 in the dashboard 94 of vehicle 10. Lever 82 is connected to cable 88 at point 96 by a suitable yielding means such as spring 98. Thus by pulling knob 90, all levers 80, 82 and 84 will be simultaneously operated. To hold knob 90 against the tension of spring 98 when the refrigerating system is operating, a shank 100 having a boss 102 thereon is secured to such knob and attached to cable 88. Opening 92 in the dashboard 94 is provided with a peripheral notch 104 through which boss 102 can pass and by rotation of knob 90, the boss 102 will engage the dashboard 94 to hold valves 62, 64 and 74 in position for operation of the refrigeration system. To return heater 16 to association with the engine cooling system, knob 90 is rotated so boss 102 registers with notch 104 and cable 88 can be pushed forwardly.

The above refrigeration system as described operates solely off of power from engine 20 and the manipulation of valves 62 and 64 simultaneously from the passenger compartment 14 provides a simple but efficient and convenient means of adapting the regular car heater 16 as the air contacting water cooled coil in such system. The usual heater fan (not shown) will be used in the same manner for cooling compartment 14 as in heating it.

As an additional feature with this refrigerating system which I prefer to use but which can be eliminated if desired is my control means indicated generally by the numeral 106 (FIG. 3) for defrosting the air contacting coil 16 if it becomes necessary to do so. The object of such control means 106 generally is the use of a suitable control that will momentarily operate levers 80 and 82 against the tension of spring 98 to cause a surge of hot fluid from the engine cooling system to pass through coil 16 when the efficiency of such coil is reduced by becoming frosted. For operation of levers 80 and 82 in my control unit 106, I used a solenoid 108 electrically connected to the car battery 110 and ground 112 and connected by link means 114 to levers 80 and 82. The means for activating solenoid 108 may take several forms and the one illustrated includes an electrical contact element 116 disposed in close spaced relationship to the outer surface of the coil 18 (FIG. 1) of member 16. Element 116 is electrically connected by lead 118 to relay 120 and from relay 120 to the solenoid 108 by lead 122. The solenoid 108 is connected as described to the regular car battery 110 and levers 80 and 82 and a ground 124 also connects to heater 16. In operation, ice forming on coil 18 will contact element 116 to close the circuit of control means 106 whereby actuation of the solenoid 108 will move levers 80 and 82 against the tension of spring 98 so that heater 16 is in communication with the regular cooling system of the vehicle the same as if knob 90 were pushed forwardly. This will, of course, result in hot fluid from the engine flowing through the heater 16 that will melt the ice on coil 18, as soon as the ice melts sufficiently to break contact with element 116, the solenoid 108 is deactivated and spring 98 will return levers 80 and 82 to their normal position for connecting heater 16 with the refrigerating system. The spacing between element 116 and coil 18 may, of course, be varied and the smaller such space, the less ice will form on the coil 18 and the shorter the time required for returning heater 16 to association with hot fluid from the engine. Merely a surge of fluid from the engine through the heater 16 is normally sufficient. As mentioned above, control 106 is illustrative of one method for accomplishing the desired result. Since the loss of efficiency in unit 16 is reflected in a diminished air supply passing therethrough any means responsive to air flow or any thermal sensitive means can be employed to activate solenoid 108 without departing from the principle disclosed, and element 116 can be positioned accordingly relative to coil 18.

The entire system as above described is not only efficient but extremely more economical compared to similar systems available today and can be easily installed in or removed from the vehicle with a minimum of work and cost. This makes it possible for a vehicle owner to use this system on one vehicle and transfer it easily to any other vehicle when he acquires a different one.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. An air cooling system for an automotive vehicle having a passenger compartment, an engine compartment with an engine therein and an air contacting coil in the passenger compartment in the form of a regular heater unit in thermal exchange association with the cooling system of the engine, said air cooling system comprising, a refrigeration system disposed wholly within said engine compartment and including a compressor, condenser and heat exchanger connected in refrigerant flow relationship, a fluid circulating system including a pump, said heat exchanger and said air contacting coil connected in fluid flow relationship, separate valve means in the engine cooling system connecting said fluid circulating system in fluid flow relationship to and from said air contacting coil, said valve means operable to selectively associate said air contacting coil in thermal exchange relationship with either said engine cooling system or fluid circulating system to the exclusion of the other, an electrical control element disposed closely adjacent said air contacting coil, a source of electric power, a control member connected thereto and electrically connected to said element, said control member actuated by ice or frost forming on said air contacting coil sufficiently to contact said electrical control element, said control member operatively connected to said valve means whereby activation of said control member operates said valve means to associate said air contacting coil in thermal exchange relationship only with the hot fluid in the cooling system of said engine the hot fluid causing the melting of the ice or frost away from said electrical control element to deactivate said control member, and deactivation of said control member operates said valve means to associate said air contacting coil only in thermal exchange relationship with said fluid circulating system.

2. An air cooling system for an automotive vehicle having a passenger compartment, an engine compartment with an engine therein and an air contacting coil in the passenger compartment in the form of a regular heater unit in thermal exchange association with the cooling system of the engine, said air cooling system comprising a refrigeration system disposed wholly within said engine compartment and including a compressor, condenser and heat exchanger connected in refrigerant flow relationship, a fluid circulating system including a pump, said heat exchanger and said air contacting coil connected in fluid flow relationship, separate valve means in the engine cooling system connecting said fluid circulating system in fluid flow relationship to and from said air contact coil, said valve means operable to selectively associate said air contacting coil in thermal exchange relationship with either said engine cooling system or fluid circulating system to the exclusion of the other, a by-pass refrigerant flow circuit from said compressor to said condenser and return a third valve member in said circuit, and control means operatively connected to all of said valves for simultaneously operating the same; said third valve set to be closed when said air contacting coil is in flow communication with said fluid circulating system and open when said air contacting coil is in flow communication with said engine cooling system.

3. A system as defined in claim 2 wherein said control means is manually operable from said passenger compartment.

4. An air cooling system for an automotive vehicle having a passenger compartment, and an engine compartment with an engine therein, comprising a refrigeration system disposed wholly within said engine compartment and including a compressor, codenser and heat exchangeer connected in refrigerant flow relationship, a fluid circulating system including a pump, said heat exchanger and an air contacting coil in said passenger compartment connected in fluid flow relationship, means associating said air contacting coil in heat exchange relationship with said engine, valve means in said last mentioned means to selectively associate said air contacting coil in thermal exchange relationship with either said engine or said fluid circulating system to the exclusion of the other, a control element assoicated with said air contacting coil, a source of electric power, a control member connected thereto and electrically connected to said element, said control member operatively connected to said valve means whereby activation of said control member operates said valve means to associate said air contacting coil in thermal exchange relationship only with said engine and deactivation of said control member operates said valve means to associate said air contacting coil only in thermal exchange relationship with said fluid circulating system.

5. A system for controlling heated and cooled air in a closed compartment of a motor vehicle having a water circulating cooling system, comprising an air contacting coil in said closed compartment, said coil being a regular form of vehicle heater in fluid flow thermal exchange association with the cooling system of said vehicle, a closed refrigerant flow system, a fluid containing heat exchanger in fluid flow thermal exchange association with said coil, said refrigerant flow system including coil means in said heat exchanger in thermal exchange association with the fluid therein, valve means operatively associated relative to the cooling system of the vehicle, said coil and said heat exchanger whereby said coil can be selectively placed in fluid flow thermal exchange association with either said heat exchanger or the cooling system of the vehicle, an electric circuit including a contact element closely adjacent said coil, control means connected to said electric circuit for actuation and operatively connected to said valve means, said electric circuit closed by formation of ice or frost on said coil so as to engage said contact element and opened by removal of said ice or frost, the closing of said circuit actuating said control means to operate said valve means whereby said coil is connected to the cooling system of the vehicle to receive a flow of hot fluid resulting in the melting of ice or frost on said coil to open said circuit, and the opening of said circuit acting on said control means to operate said valve means to place said coil in flow communication with said heat exchanger.

6. A system for controlling heated and cooled air in the passenger compartment of a motor vehicle having a water circulating cooling system, comprising an air contacting coil in the passenger compartment, said coil being a regular form of vehicle heater in fluid flow thermal exchange association with the cooling system of said vehicle, a closed refrigerant flow system, a heat exchanger in fluid flow thermal exchange association with said coil so as to contain a supply of fluid from the cooling system of the vehicle, said refrigerant flow system in thermal exchange association with said heat exchanger, a valve in the flow line between said coil and the cooling system of the vehicle operable to open and close flow communication therein, a second valve in the flow line between said coil and said heat exchanger operable to open and close flow communiaction therein, and control means for simultaneously operating said valves so that only one valve is in open position at any given time to afford selective flow communication between said coil and said heat exchanger and cooling system.

7. A system for controlling heated and cooled air in the passenger compartment of a motor vehicle having a water circulating cooling system, comprising an air contacting coil in the passenger compartment, said coil being a regular form of vehicle heater in fluid flow thermal exchange association with the cooling system of said vehicle, a closed refrigerant flow system, a heat exchanger in fluid flow thermal exchange association with said coil so as to contain a supply of fluid from the cooling system of the vehicle, said refrigerant flow system in thermal exchange association with said heat exchanger, a valve in the flow line between said coil and the cooling system of the vehicle operable to open and close flow communication therein, a second valve in the flow line between said coil and said heat exchanger operable to open and close flow communication therein, manually operable control means for simultaneously operating said valves so that only one valve is in open position at any given time to afford selective flow communication between said coil and said heat exchanger and cooling system, and electrically automatically operable control means associated with said valves for simultaneously operating the same independently of said manual control means.

8. In an automotive vehicle unit having an engine compartment with an engine therein and a second compartment in which temperature control is desired, means for selectively cooling and heating said second compartment comprising a closed refrigeration system disposed wholly within said engine compartment and including a compressor and condenser, a fluid containing heat exchanger, a refrigerant coil in said refrigeration system within said heat exchanger in thermal relationship to the fluid therein, a fluid circulating system including a pump for moving the fluid in said heat exchanger, an air contacting coil in said second compartment, fluid flow communication between said air contacting coil and said engine and between said air contacting coil and said fluid circulating system, valve means to selectively associate said air contacting coil with said engine and said fluid circulating system, and the fluid in said heat exchanger susceptible of flow communication with said engine by reason of the mutual flow communication between said heat exchanger and said engine with said coil, and including means connecting said compressor to said engine for continual operation while the engine is operating, a by-pass refrigerant flow circuit from said compressor to condenser and return, valve means in said refrigerant flow circuit operable to close said circuit when the air contacting coil is associated with the fluid circulating system and to open said circuit when the air contacting coil is in flow communication with said engine, and control means connected to all of said valve means for simultaneously operating the same.

References Cited in the file of this patent

UNITED STATES PATENTS

| | | |
|---|---|---|
| 1,980,688 | Lewis | Nov. 13, 1934 |
| 2,264,848 | Kahl | Dec. 2, 1941 |
| 2,292,335 | Durbin | Aug. 4, 1942 |

| | | |
|---|---|---|
| 2,454,263 | Newton | Nov. 16, 1948 |
| 2,667,045 | McCarty | Jan. 26, 1954 |
| 2,744,389 | Raney | May 8, 1956 |
| 2,761,293 | Enbank | Sept. 4, 1956 |
| 2,774,222 | Jacobs et al. | Dec. 18, 1956 |
| 2,787,129 | Evans | Apr. 2, 1957 |
| 2,801,827 | Dolza | Aug. 6, 1957 |
| 2,887,852 | Thomas | May 26, 1959 |